United States Patent
Iyer et al.

(10) Patent No.: US 7,058,706 B1
(45) Date of Patent: Jun. 6, 2006

(54) METHOD AND APPARATUS FOR DETERMINING LATENCY BETWEEN MULTIPLE SERVERS AND A CLIENT

(75) Inventors: Shankar Iyer, Cupertino, CA (US); Sridhara Lanka, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 521 days.

(21) Appl. No.: 09/657,016

(22) Filed: Sep. 7, 2000

Related U.S. Application Data

(60) Provisional application No. 60/193,988, filed on Mar. 31, 2000.

(51) Int. Cl.
*G06F 15/173* (2006.01)

(52) U.S. Cl. ........................ 709/223; 709/224; 709/241
(58) Field of Classification Search ........ 709/220–232, 709/238–244; 710/11
See application file for complete search history.

(56) References Cited

U.S. PATENT DOCUMENTS

| | | | |
|---|---|---|---|
| 5,729,689 | A | 3/1998 | Allard et al. |
| 5,774,660 | A | 6/1998 | Brendel et al. |
| 5,918,228 | A | 6/1999 | Rich et al. |
| 6,029,196 | A | 2/2000 | Lenz |
| 6,052,718 | A * | 4/2000 | Gifford ........................ 709/219 |
| 6,070,191 | A | 5/2000 | Narendran et al. |

(Continued)

FOREIGN PATENT DOCUMENTS

EP    0817020 A2    1/1998

(Continued)

OTHER PUBLICATIONS

Y. Rekhter, RFC 1265-BGP Protocol Analysis, Oct. 1991, IBM Corp., pp. 1-7).*

(Continued)

*Primary Examiner*—William C. Vaughn, Jr.
*Assistant Examiner*—David England
(74) *Attorney, Agent, or Firm*—Hickman Palermo Truong & Becker LLP; Kirk D. Wong

(57) ABSTRACT

A method and apparatus for determining latency between multiple servers and a client receives requests for content server addresses from local domain names servers (LDNS). POPs that can serve the content are determined and sent latency metric requests. The content server receives the request for latency metrics and looks up the latency metric for the requesting client. Periodic latency probes are sent to the IP addresses in a Latency Management Table. The IP addresses of clients are masked so the latency probes are sent to higher level servers to reduce traffic across the network. The hop count and latency data in the packets sent in response to the latency probes are stored in the Latency Management Table and is used to determine the latency metric from the resident POP to the requesting client before sending the latency metric to the requesting server. The BGP hop count in the Latency Management Table is used for the latency metric upon the first request for an IP address. The latency metric is calculated for subsequent requests of IP addresses using the hop count and RTT data in the Latency Management Table. Latency metrics from POPs are collected and the inverse relationship of the hop counts in a weighted combination with the RTT are used to determine which latency metric indicates the optimal POP. The address of the optimal POP is then sent to the requesting LDNS.

12 Claims, 6 Drawing Sheets

U.S. PATENT DOCUMENTS

| | | | |
|---|---|---|---|
| 6,078,943 | A | 6/2000 | Yu |
| 6,092,178 | A | 7/2000 | Jindal et al. |
| 6,112,239 | A | 8/2000 | Kenner et al. |
| 6,118,765 | A * | 9/2000 | Phillips ................... 370/235 |
| 6,119,171 | A | 9/2000 | Alkhatib |
| 6,128,279 | A | 10/2000 | O'Neil et al. |
| 6,173,311 | B1 | 1/2001 | Hassett et al. |
| 6,182,148 | B1 | 1/2001 | Tout |
| 6,249,801 | B1 | 6/2001 | Zisapel et al. |
| 6,256,675 | B1 * | 7/2001 | Rabinovich ............... 709/241 |
| 6,292,832 | B1 * | 9/2001 | Shah et al. ............... 709/226 |
| 6,298,381 | B1 * | 10/2001 | Shah et al. ............... 709/228 |
| 6,381,627 | B1 | 4/2002 | Kwan et al. |
| 6,405,252 | B1 | 6/2002 | Gupta et al. |
| 6,415,323 | B1 * | 7/2002 | McCanne et al. .......... 709/225 |
| 6,430,619 | B1 | 8/2002 | Sitaraman et al. |
| 6,449,647 | B1 * | 9/2002 | Colby et al. ............... 709/226 |
| 6,546,014 | B1 * | 4/2003 | Kramer et al. ......... 370/395.41 |
| 6,560,717 | B1 | 5/2003 | Scott et al. |
| 6,650,621 | B1 * | 11/2003 | Maki-Kullas ............... 370/238 |
| 6,665,271 | B1 * | 12/2003 | Thomas et al. ............. 370/252 |
| 6,735,631 | B1 * | 5/2004 | Oehrke et al. .............. 709/226 |
| 6,795,860 | B1 * | 9/2004 | Shah ........................ 709/229 |
| 2002/0099816 | A1 | 7/2002 | Quarterman et al. |
| 2005/0097445 | A1 | 5/2005 | Day et al. |

FOREIGN PATENT DOCUMENTS

| | | |
|---|---|---|
| EP | 0959601 A1 | 11/1999 |
| WO | WO 99/29083 A1 | 6/1999 |
| WO | WO 00/22526 A1 | 4/2000 |

OTHER PUBLICATIONS

Bhattachjarjee, S. et al., "Application-Layer Anycasting", Proceedings of the IEEE Infocom '97, Apr. 7-12, 1997, vol. 3.

Moore, et al. "Sonar—a Network Proximity Service", IETF Internet Draft, Feb. 23, 1996, P.2, para. 2-4, p. 5, para 1, 2 p. 6, para 4 -p. 7 para 2.

Guyton, et al., "Locating Nearby Copies of Replicated Internet Servers"; Computer Communications Review, Association For Computing Machinery. New York, US, vol. 25, No. 4, Oct. 1, 1995, pp. 288-298.

Fei, et al., "A Novel Server Selection Technique for Improving the Response Time of a Replicated Service", Proceedings of the IEEE Infocom '98 Conference, San Francisco, CA, vol. 2, Mar. 29, 1998, pp. 783-791.

Schemers, R.J., "Ibnamed: A Load Balancing Name Server in Perl," Proceedings of the Systems Administration Conference, Sep. 17, 1995, pp. 1-11, XP002054865, p. 2, left-hand column, para 3; p. 3, left-hand column, para 1.

Zhou, Tao, "Web Server Load Balancers". Apr. 2000, Windows & .NET Magazine.

C. Grimm, et al., "Load and Traffic Balancing in Large Scale Cache Meshes," 1998, Computer Networks and ISDN Systems, XP004138701, pp. 1687-1695.

S. Paul, et al., "Distributed Caching with Centralized Control," 2001; Computer Communications, pp. 256-268.

Joze Rugelj, et al, "Advanced Mechanism for the Efficient Employment of Distributed Hypermedia Applications in Education," 1996, XP-002194090, 4 pages.

K.-L. Wu, et al., "SpeedTracer: A Web Usage Mining and Analysis Tool," 1998, IBM Systems Journal, vol. 37, No. 1, pp. 89-105.

I. Cooper, et al., "Internet Web Replication and Caching Taxonomy, draft-ietf-wrec-taxonomy-05.txt," Jul. 4, 2000, Internet-Draft, XP-002194089, 31 pages.

* cited by examiner

| IP address 301 | BGP hop count 302 | Trace 303 |
| --- | --- | --- |
| 4.0.0.0/8 | 3 | 10/100ms |
| 10.6.0.0/4 | 2 | 8/80ms |
|  |  |  |

Fig. 3

METHOD AND APPARATUS FOR DETERMINING LATENCY BETWEEN MULTIPLE SERVERS AND A CLIENT

CROSS-REFERENCES TO RELATED APPLICATIONS

The present application claims priority to U.S. Provisional Application No. 60/193,988 filed Mar. 31, 2000 commonly owned, and hereby incorporated by reference for all purposes.

BACKGROUND OF THE INVENTION

1. Technical Field

The invention relates to the routing of requests to a networked server in a computer environment. More particularly, the invention relates to determining a dynamic hop count between two nodes across a network in a computer environment.

2. Description of the Prior Art

The Internet is a confederation of loosely connected networks that connect computers all around the world. The proliferation of information and immense user population has made the management of information critical. Information is mirrored on multiple servers in order to improve performance, availability, and scalability.

To facilitate the mirroring of information, clients requesting information need to be routed to the optimal server. The traffic management industry routes traffic to the optimal server using different latency metrics including the Round Trip Time (RTT) and hop count. The Round Trip Time measures the time it takes for a packet to travel between a server and a client or another server.

The dynamic hop count between a client and a server is typically derived from the Border Gateway Protocol (BGP). BGP is specified in RFC 1267 published in October 1991 and RFC 1654 published in July 1994. BGP gives the hops between different Autonomous System Numbers (ASN). The dynamic hop count can be used to differentiate latency metrics that might be close in terms of RTT.

The primary function of a BGP speaking system is to exchange network reachability information with other BGP systems. The network reachability information includes information on the Autonomous Systems (AS) that the reachability information traverses. A BGP speaker advertises to its peers, i.e., other BGP speakers that it communicates with, in neighboring ASs only those routes that it uses. The information is sufficient to construct a graph of AS connectivity from which routing loops may be pruned.

Determining the dynamic hop count is currently problematic due to the following reasons:

1. BGP hops: The actual number of hops will typically be larger than that advertised by the BGP protocol since BGP only gives the hops between the ASNs.
2. IP hops: Getting hop counts from the Internet Protocol (IP) is difficult because the Time To Live (TTL) field that is part of the IP header is not initialized to standard values by the various TCP/IP stack software running on various Operating Systems, e.g., Windows 98, Linux, NT, etc.

The invention described in this patent provides a different and more precise method of determining the dynamic hop count.

It would be advantageous to provide a method and apparatus for determining latency between multiple servers and a client that provides a more precise method of determining dynamic hop counts. It would further be advantageous to provide a method and apparatus for determining latency between multiple servers and a client that reduces the traffic required to measure the hops across the network.

SUMMARY OF THE INVENTION

The invention provides a method and apparatus for determining latency between multiple servers and a client. The system provides a more precise method of determining dynamic hop counts and optimal content servers. In addition, the invention reduces network traffic required for measuring the dynamic hop counts.

A preferred embodiment of the invention receives requests for content server addresses from local domain names servers (LDNS). POPs that can serve the content are determined and sent latency metric requests.

The content server receives the request for latency metrics and looks up the latency metric for the client of the requesting LDNS. Periodic latency probes are sent to the IP addresses in a Latency Management Table. The IP addresses of clients are masked so the latency probes are sent to higher level servers to reduce traffic across the network. The hop count and latency data in the packets sent in response to the latency probes are stored in the Latency Management Table.

The information in the Latency Management Table is used to determine the latency metric from the resident POP to the requesting client before sending the latency metric to the requesting server. The BGP hop count in the Latency Management Table is used for the latency metric upon the first request for an IP address. The latency metric is calculated for subsequent requests of IP addresses using the hop count and RTT data in the Latency Management Table.

Latency metrics from POPs are collected and the inverse relationship of the hop counts in a weighted combination with the RTT are used to determine which latency metric indicates the optimal POP. The address of the optimal POP is then sent to the requesting LDNS.

Other aspects and advantages of the invention will become apparent from the following detailed description in combination with the accompanying drawings, illustrating, by way of example, the principles of the invention.

BRIEF DESCRIPTION OF THE DRAWINGS

FIG. 3 is a diagram of a Latency Management table according to the invention;

DETAILED DESCRIPTION OF THE INVENTION

The invention is embodied in a method and apparatus for determining latency between multiple servers and a client in a computer environment. A system according to the invention provides a more precise method of determining dynamic hop counts and optimal content servers. In addition, the invention provides a system that reduces network traffic required for measuring the dynamic hop counts.

The invention provides a new method to determine the dynamic hop count between two nodes (client and server). This new method provides a dynamic hop count that is more precise than the hop count obtained using the Border Gateway Protocol (BGP).

The latency probes in a Speedera Network are responsible for determining the latency between the Speedera servers and a client. This latency information is used by the Speedera Domain Name Server (SPDNS) to direct a client to the server that is "closest" to the client in latency.

Figure 1:
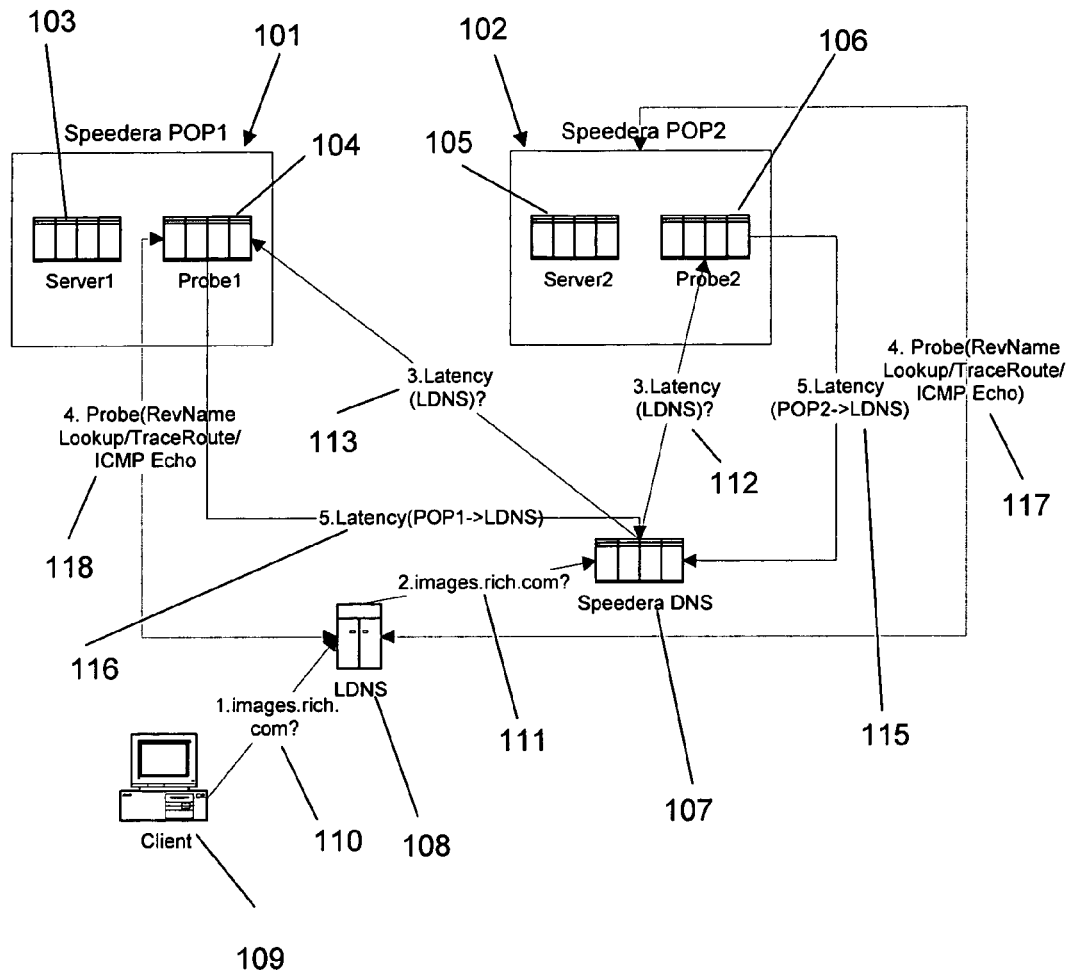
FIG. 1 is a block schematic diagram of a preferred embodiment of the invention measuring latency between servers and a client according to the invention.

Referring to FIG. 1, each Speedera Point of Presence (POP) 101, 102 has a probe server 104, 106 and other infrastructure servers 103, 105. When the Client 109 receives a request, it tries to resolve the request from the Local Domain Name Server (LDNS) 108. If the LDNS 108 cannot resolve the request, it forwards the request to the Speedera Domain Name Server (SPDNS) 107. The SPDNS 107 then routes the request to the optimal POP 101, 102 by determining the server "closest" to the LDNS 108.

In this example, the Client 109 performs a name lookup for web content images.rich.com/images 110. The local DNS (LDNS) client 108 forwards the request 111 to the SPDNS 107.

The SPDNS 107 requests latency information 112, 113 from the Speedera probes 104, 106 at locations that can serve images.rich.com (POP1 101 and POP2 102). The latency probes 104, 106 initiate probes 117, 118 to the LDNS 108. The latency probes 104, 106 return the latency metrics 115, 116 to the SPDNS 107.

The main components that are used by the invention to determine latency metrics are as follows:

RTT time from the latency probe to LDNS.
ASN (Autonomous System Number) routing information derived from Border Gateway Protocol (BGP).
Dynamic hop count from the latency probe to LDNS.

BGP is a standard algorithm implemented in routers. It is a routing protocol that is used between large routers covering large administrative domains. All routes that are available within a network are exported to another network in an abbreviated form. The network reachability information includes information on the Autonomous Systems (AS) that the reachability information traverses. A BGP speaker (router) advertises to its peers, i.e., other BGP speakers that it communicates with, in neighboring ASs only those routes that it uses.

An AS is a set of routers under a single technical administration, using an interior gateway protocol and common metrics to route packets within the AS, and using an exterior gateway protocol to route packets to other ASs.

The latency probe 104, 106 uses a UDP Reverse Name Lookup and Traceroute to determine RTT and dynamic hop count through the paths 117, 118. Reverse Name Lookup is a standard DNS query that specifies a client IP address and asks for the client name. Traceroute is a specific format of a packet that is sent between routers to indicate if a packet has reached a destination.

Obtaining absolute hop counts is ideal, however, this is not a realistic goal in the real world. Quite often some of the local DNSs are unavailable because they are sitting behind a firewall or the DNS will drop the packet thinking that it is a denial of service attack. With these restrictions, it is not possible to reliably use an absolute hop count. Additionally, as described below, the IP packet information is not uniform throughout the network.

Figure 2:
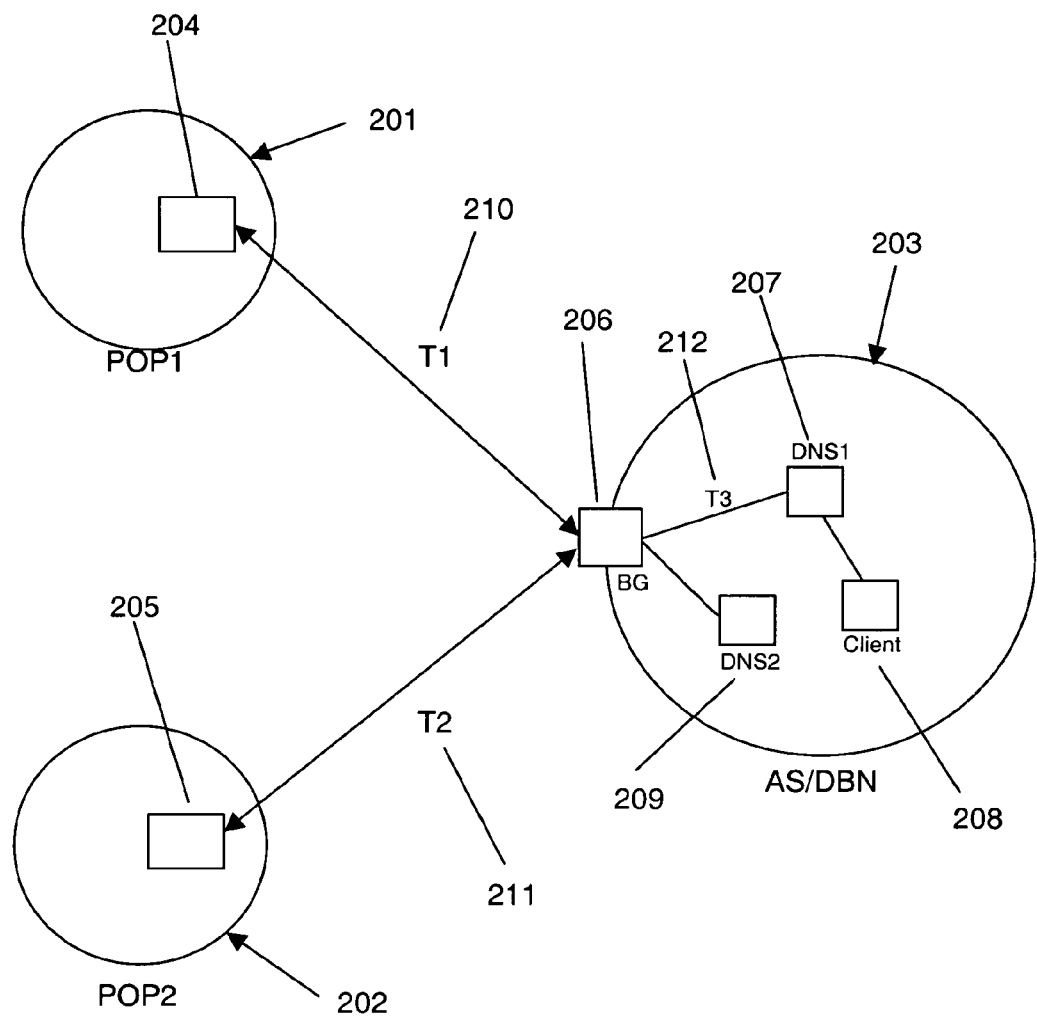
FIG. 2 is a block schematic diagram of an example of a preferred embodiment of the invention measuring dynamic hop counts from two POPs to a Border Gateway server according to the invention.

With respect to FIG. 2, most of the time the ASN 203 is easily reached. Even from various diverse points it is possible to converge onto the AS 203. However, it is the path required to reach the AS 203 from each server that is the important factor.

POP1 201 and Pop2 202 must each find the distance from themselves to the ASN 203. The latency for each path must also be found. The distance and latency are calculated by using the hop count and latency time, respectively.

Currently, it is only possible to measure hop count and latency time by sending a packet to the destination. However, as previously mentioned, most of the time the packet is sent back as not being able to reach the destination.

The invention aggregates the client 208 and the higher level server DNS 207 and assumes that they are co-located. Additionally, the latency and the hop counts are measured up to the Border Gateway (BG) 206. Once the autonomous system is entered, the hop counts are not as important. The distance from the BG 206 to the client 208 is the same from either POP 201, 202 at that point. Therefore, the relevant distance is to the BG 206. In other words, the distance T1 210 and T2 211 are most likely not equal, but the distance T3 212 is the same for both POPs 201, 202.

The address of the client 208 is masked to the IP prefix of the ASN 203. For example, if the address of the client 208 is 4.10.20.30 then the address is masked to the ASN 203 which is 4.0.0.0. The mask can vary depending on the higher level server granularity desired. For example, the first eight bits may be masked to the higher level server DNS 207, i.e., the address would then be masked to 4.10.20.00. This can be adjusted depending on the size of the network.

The data in the BGP table does not change over a period of time. Incremental updates are sent as the routing tables change. However, BGP does not require periodic refresh of the entire BGP routing table. Therefore, a BGP speaker must retain the current version of the entire BGP routing tables of all of its peers for the duration of the connection.

The invention performs its measurements a few times a day to achieve a good picture of the network status. The invention reduces Internet traffic by aggregating at a higher level and therefore requires less probes.

Referring to FIG. 3, a latency management table is used by the invention. The table contains the following fields: IP address 301; BGP hop count 302; and Trace data 303. The IP address field 301 contains the IP addresses that the server is responsible for. BGP hop counts 302 is taken from the BGP routing table for the particular IP address. The Trace data field 303 contains the latency and dynamic hop count information obtained by the latency probes.

The BGP hop count 302 is used by the SPDNS when the first request from an LDNS comes in for a particular IP address. No previous connection has been established at this point. This is because the dynamic hop count to the BG takes some time to actually measure. Subsequent requests use the actual dynamic BG hop count measured by the system located in the Trace field 303. The latency measurement is also taken and the combination of the dynamic hop count and latency measurement in the Trace field 303 is used to determine which SPDNS is closest to the client.

The invention does not need to get absolute hop counts from the various probe servers to the LDNS. It is sufficient to determine the relative (dynamic) hop counts between the probe servers and the LDNS and use this information in arriving at relative latency metrics between the client and the probe servers. This information can then be used by the Speedera DNS to choose between the service points and locate a server that is closest to the client.

Figure 4:
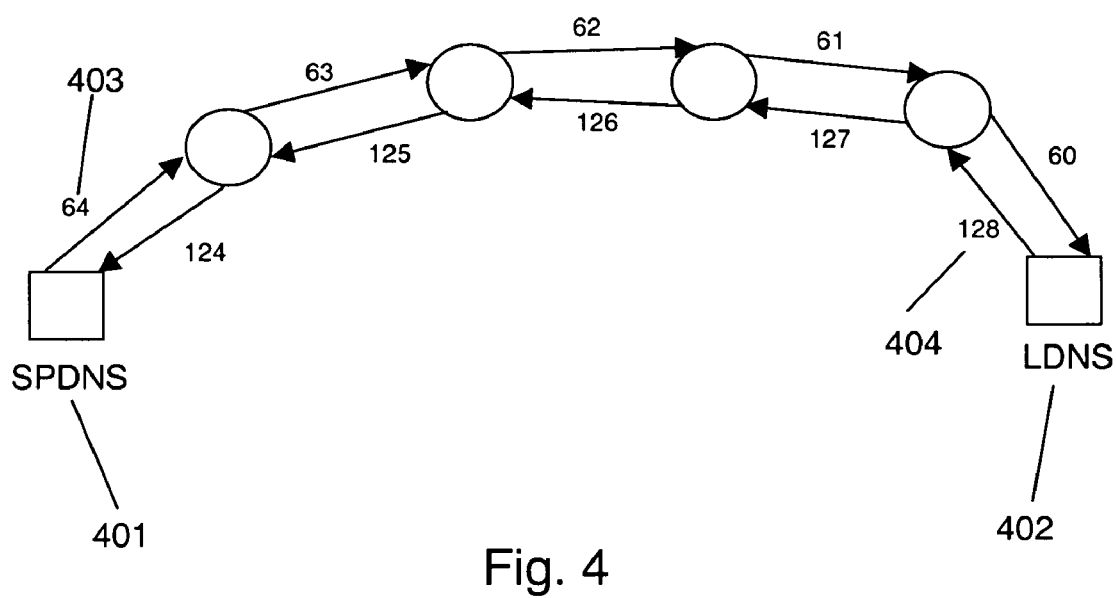
FIG. 4 is a block schematic diagram of an example of differing TTL values in IP packets according to the invention.

With respect to FIG. 4, the invention is based on the very safe assumption that the target LDNS 402 will always send out packets with a fixed TTL independent of the SPDNS 401 that initiated a probe. Getting hop counts from the Internet Protocol (IP) is difficult because the Time To Live (TTL) field that is part of the IP header is not initialized to standard values by the various TCP/IP stack software running on various Operating Systems, e.g., Windows 98, Linux, NT, etc.

In this example, the SPDNS 401 originates a packet with a TTL of 64 403. The LDNS 402 always sends out packets with its own independent TTL value of 128 404. DNS's will send whatever TTL value that they prefer. The values may differ between each DNS, but each DNS is consistent in its TTL value.

Figure 5:
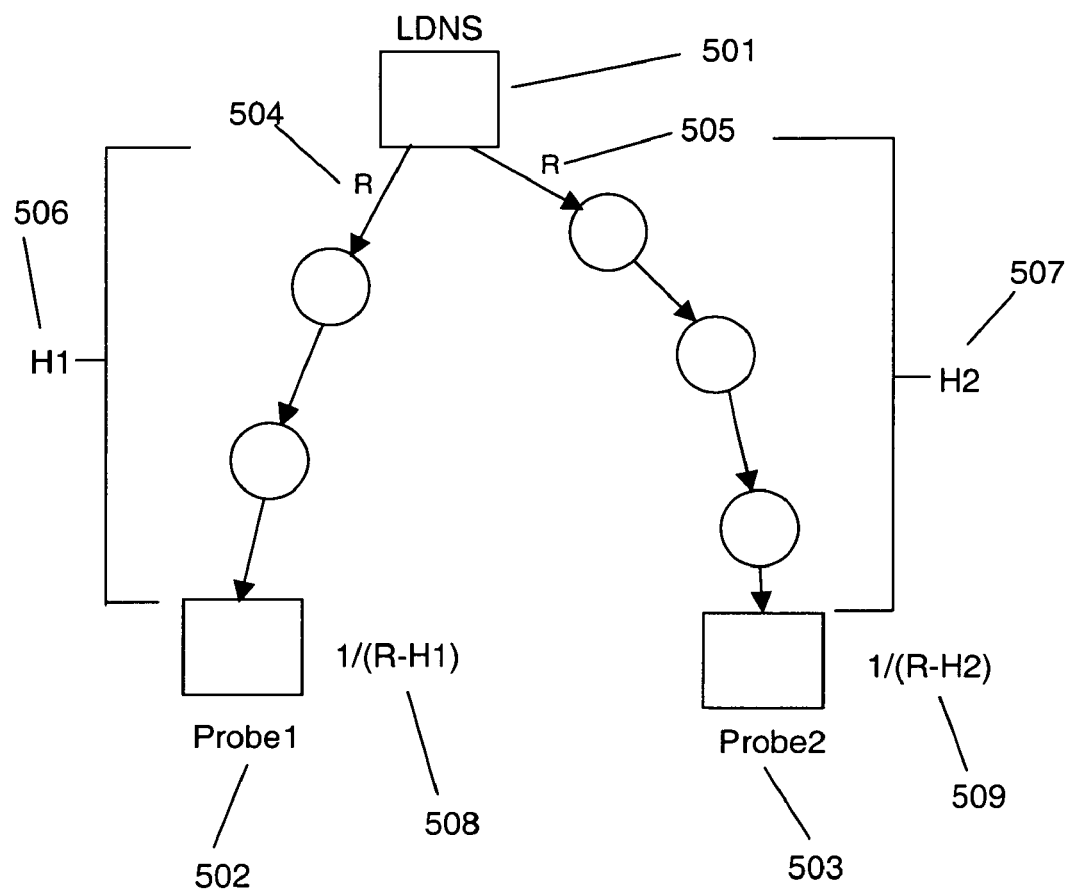
FIG. 5 is a block schematic diagram of the inverse relationship of dynamic hop counts in a preferred embodiment of the invention according to the invention.

Referring to FIG. 5, the two probe servers (Probe1 502 and Probe2 503) have initiated probes to the LDNS 501. The LDNS 501 returns a response to each of the probe servers. Here, the LDNS 501 sets the TTL in the response IP packet to R 504, 505. The TTL will be decremented by 1 each time the packet passes through a router (hop). In this example, the packets go through H1 hops 506 between LDNS 501 and Probe1 502 and H2 hops 507 between LDNS 501 and Probe2 503. The TTL of the response packet that arrives at Probe1 502 will be (R-H1) and which arrives at Probe2 503 will be (R-H2). The TTL of the response at Probe1 502 and Probe2 503 will be in inverse relation to the number of hops 508, 509 (The fewer the number of hops, the higher the TTL). Thus, a relative dynamic hop count can be arrived at by subtracting the TTL in the response packet from a fixed value R.

The latency metric is a weighted combination of the RTT and the dynamic hop count (e.g., (RTT*w1)+(dynamic hop count*w2), where w1 and w2 are relative weights). The latency metric is used to determine the server that is the most efficient for accessing a client. The invention precisely determines the hop count metric between client and server.

The latency metric is a weighted combination of the RTT and the dynamic hop count (e.g., (RTT*w1)+(dynamic hop count*w2), where w1 and w2 are relative weights). The latency metric is used to determine the server that is the most efficient for accessing a client. The invention precisely determines the hop count metric between client and server.

The dynamic hop count metric derived through the invention is more accurate than the hop count derived from BGP. As a result, requests will be routed more accurately to the optimal server resulting in improved performance. The invention improves performance in multiple Internet infrastructure products including performance monitoring, WAN traffic management, and content distribution.

Figure 6:
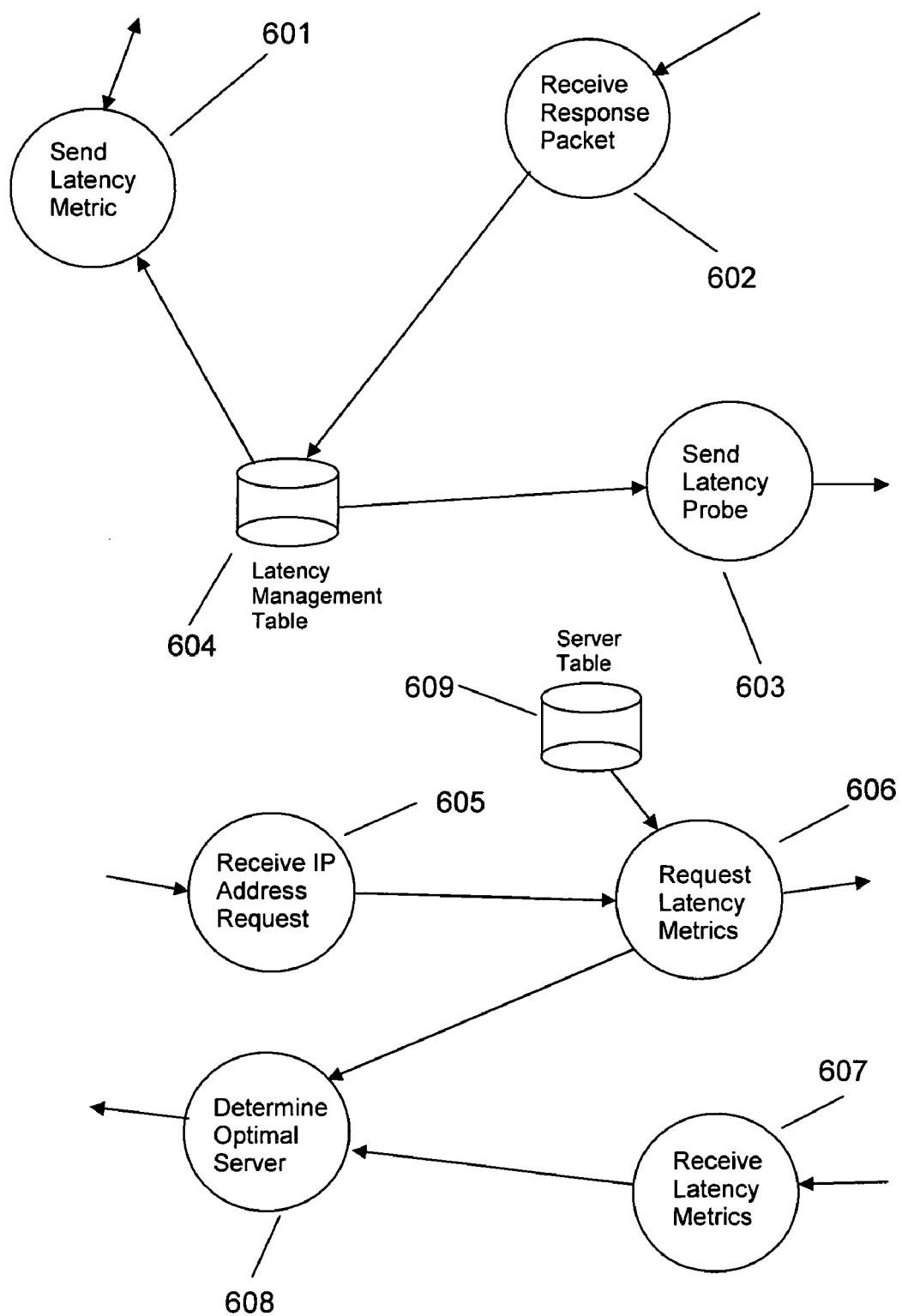
FIG. 6 is a block schematic diagram of a task-level viewpoint of a preferred embodiment of the invention according to the invention.

With respect to FIG. 6, a task level viewpoint of the invention is shown. Requests for content server addresses from LDNS's are received by the Receive IP Address Request module 605. The Receive IP Address Request module 605 sends the content request to the Request Latency Metrics module 606. POPs that can serve the content are retrieved from the Server Table 609 by the Request Latency Metrics module 606. The Request Latency Metrics module 606 then sends latency metric requests to the POPs that can serve the content and notifies the Determine Optimal Server module 608 that latency metrics are expected.

Request for latency metrics activate the Send Latency Metric module 601 to lookup the latency metric for the requesting LDNS's client. The Send Latency Probe module 603 sends latency probes to the IP addresses in the Latency Management Table 604. The IP addresses of clients are masked so the latency probes are sent to higher level servers as detailed above. Packets sent in response to the latency probes sent by the Send Latency Probe module 603 are received by the Receive Response Packet module 602. Dynamic hop count and latency data are stored into the Latency Management Table 604.

The Send Latency Metric module 601 uses the information in the Latency Management Table 604 to determine the latency metric from the resident POP to the requesting LDNS's client before sending the latency metric to the requesting server. The Send Latency Metric module 601 uses the BGP hop count in the Latency Management Table 604 for its calculations upon the first request for an IP address. The latency metric is calculated for subsequent requests of IP addresses by the Send Latency Metric module 601 using the dynamic hop count and RTT data obtained from the Receive Response Packet module 602.

Latency metrics from POPs are received by the Receive Latency Metrics module 607. The latency metrics are sent to the Determine Optimal Server module 608. The Determine Optimal Server module 608 gathers the expected latency metrics and uses the inverse relationship of the dynamic hop counts in a weighted combination with the RTT to determine which latency metric indicates the optimal POP. The Determine Optimal Server module 608 then sends the address of the optimal POP to the requesting LDNS.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for determining latency between multiple servers and a client across a network in a computer environment, comprising the steps of:
   receiving a request for a content server address from said client;
   sending a latency metric request from a server to an appropriate probe server;
   receiving a request for latency metrics on a probe server;
   wherein said latency metric request specifies a particular client;
   wherein a latency management table initially comprises a list of IP addresses along with corresponding Border Gateway Protocol (BGP) hop counts;
   looking up the latency metric for said client in said latency management table;
   sending said latency metric to the requesting server;
   receiving latency metric data from said probe server at the requesting server;
   determining an optimal content server for said client using said latency metric data;
   sending said optimal content server's address to said client;
   wherein only the BGP hop count for said client in said latency management table is used for said latency metric upon an initial request for said client; and wherein the probe server determines a dynamic hop count and Round Trip Time (RTT) data for said client after the initial request enters the dynamic hop count and RTT information into said latency management table, and uses the dynamic hop count and RTT information for said latency metric for subsequent requests for said client.

2. The process of claim 1, further comprising the steps of:

sending periodic latency probes to the IP addresses in said latency management table;

receiving response packets for said latency probes; and recording the dynamic hop count and latency (RTT) data in said latency management table.

3. The process of claim 2, wherein periodic latency probes are sent to a higher level server of a client by masking said client's IP address in said latency management table.

4. The process of claim 1, wherein said determining step gathers the expected latency metrics and uses the inverse relationship of the dynamic hop counts in said latency metric data in a weighted combination with the RTT in said latency metric data to determine which latency metric data indicates the optimal content server.

5. An apparatus for determining latency between multiple servers and a client across a network in a computer environment, comprising:

a module for receiving a request for a content server address from said client;

a module for sending a latency metric request from a server to an appropriate probe server;

a module for receiving a request for latency metrics on a probe server;

wherein said latency metric request specifies a particular client;

a latency management table;

wherein said latency management table initially comprises a list of IP addresses along with corresponding Border Gateway Protocol (BGP) hop counts;

a module for looking up the latency metric for said client in said latency management table;

a module for sending said latency metric to the requesting server;

a module for receiving latency metric data from said probe server at the requesting server;

a module for determining an optimal content server for said client using said latency metric data;

a module for sending said optimal content server's address to said client;

wherein only the BGP hop count for said client in said latency management table is used for said latency metric upon an initial request for said client; and wherein the probe server determines a dynamic hop count and Round Trip Time (RTT) data for said client after the initial request, enters the dynamic hop count and RTT information into said latency management table, and uses the dynamic hop count and RTT information for said latency metric for subsequent requests for said client.

6. The apparatus of claim 5, further comprising:

a module for sending periodic latency probes to the IP addresses in said latency management table;

a module for receiving response packets for said latency probes; and a module for recording the dynamic hop count and latency (RTT) data in said latency management table.

7. The apparatus of claim 6, wherein periodic latency probes are sent to a higher level server of a client by masking said client's IP address in said latency management table.

8. The apparatus of claim 6, wherein said determining module gathers the expected latency metrics and uses the inverse relationship of the dynamic hop counts in said latency metric data in a weighted combination with the RTT in said latency metric data to determine which latency metric data indicates the optimal content server.

9. A program storage medium readable by a computer, tangibly embodying a program of instructions executable by the computer to perform method steps for determining latency between multiple servers and a client across a network in a computer environment, comprising the steps of:

receiving a request for a content server address from said client;

sending a latency metric request from a server to an appropriate probe server;

receiving a request for latency metrics on a probe server;

wherein said latency metric request specifies a particular client;

wherein a latency management table initially comprises a list of IP addresses along with corresponding Border Gateway Protocol (BGP) hop counts;

looking up the latency metric for said client in said latency management table;

sending said latency metric to the requesting server;

receiving latency metric data from said probe server at the requesting server;

determining an optimal content server for said client using said latency metric data;

sending said optimal content server's address to said client;

wherein only the BGP hop count for said client in said latency management table is used for said latency metric upon an initial request for said client; and wherein the probe server determines a dynamic hop count and Round Trip Time (RTT) data for said client after the initial request enters the dynamic hop count and RTT information into said latency management table, and uses the dynamic hop count and RTT information for said latency metric for subsequent requests for said client.

10. The method of claim 9, further comprising the steps of:

sending periodic latency probes to the IP addresses in said latency management table;

receiving response packets for said latency probes; and recording the dynamic hop count and latency (RTT) data in said latency management table.

11. The method of claim 10, wherein periodic latency probes are sent to a higher level server of a client by masking said client's IP address in said latency management table.

12. The method of claim 9, wherein said determining step gathers the expected latency metrics and uses the inverse relationship of the dynamic hop counts in said latency metric data in a weighted combination with the RTT in said latency metric data to determine which latency metric data indicates the optimal content server.

* * * * *